Patented May 7, 1946

2,399,684

UNITED STATES PATENT OFFICE 2,399,684

LIQUID VINYL RESIN DISPERSION

Gerry P. Mack, Jackson Heights, N. Y., assignor to Advance Solvents & Chemical Corporation, New York, N. Y., a corporation of New York No Drawing. Application October 3, 1942, Serial No. 460,661

11 Claims. (Cl. 260—4)

My invention relates to a new liquid vinyl resin dispersion, to a process for manufacturing such dispersion and to the products obtainable from blends of the new dispersion with rubber latex.

One object of my invention is to produce a stable liquid vinyl resin dispersion which can be blended with rubber latex to form substantially stable emulsions capable of controlled and uniform coagulation.

Another object of my invention is to devise a method whereby a stable liquid vinyl resin dispersion suitable for blending with rubber latex is obtained without the use of any emulsifying or dispersing agents.

A further object of my invention is to provide a liquid vinyl resin dispersion which consists of solid particles of polymerized vinyl resins suspended in liquid monomeric vinyl resin.

A still further object of my invention is to manufacture, from rubber latex blended with my new liquid vinyl resin dispersion, articles having an excellent resistance against organic solvents as well as a high modulus and other desirable properties such as good tensile strength, elongation, hardness and abrasion resistance characteristics.

According to the present invention I accomplish these and other objects which will appear more clearly as the specification proceeds, by the methods, compounds and compositions set forth in the following detailed description, illustrated by the examples contained therein and defined in the appended claims.

Generally, I prefer to produce a stable liquid vinyl resin dispersion of the type described by mixing a small quantity of monomeric liquid alpha unsaturated aliphatic carboxylic acid having the general formula:

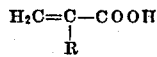

where R is selected from the group consisting of hydrogen and the lower alkyls, with a greater quantity of a monomeric liquid selected from the group consisting of acrylo-nitrile compounds having the general formula

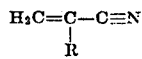

where R is selected from the group consisting of hydrogen and the lower alkyls, and subjecting the resulting mixture in the presence of a catalyst to a controlled heat polymerization until a smooth, uniform, stable, milky dispersion is obtained, which seems to be a co-polymer of the two starting materials.

The heat polymerization may be effected, for instance, by refluxing the mixture for a period from about one-half hour to about two hours.

The carboxylic acids from which one of the monomeric starting materials for my process is to be selected include acrylic acid and the alpha lower alkyl substituted acrylic acids, such as methacrylic acid and alpha ethyl acrylic acid.

The group from which the second starting material is to be selected includes, besides acrylo nitrile, such compounds as methacrylo nitrile and ethacrylo nitrile.

Particularly satisfactory results have been obtained with mixtures containing about 1 mol of monomeric methacrylic acid to between about 12 and 30 mols of monomeric acrylo nitrile.

The catalysts which are useful in my process are the same as used generally for the polymerization of vinyl resins. Peroxides, such as benzoyl peroxide, or barium peroxide, persulfates, such as sodium persulfate, and other oxygen containing substances can be employed separately or in mixture.

The vinyl resin dispersions according to my invention can be blended with rubber latex at the rate of between 8 and 40 parts vinyl resin dispersion to about 100 parts of solid rubber particles dispersed in water.

If the vinyl resin dispersion contains a high proportion of the carboxylic acid, the rubber-latex-vinyl-resin dispersion blends, and particularly those containing a relatively large quantity of the vinyl resin dispersion, may develop a slight tendency to coagulation due to the relatively large amount of acid present. However, this tendency can be easily overcome by adding to the blend a suitable amount of a latex stabilizer, such as a sulfonated higher alcohol, for instance lauryl alcohol sulfate, a polyethylene ether of a fatty acid glyceride, a sulfonated naphthalene salt, an ammonium caseinate or the like. In some cases a small quantity of a protective colloid, like casein or glue will serve the same purpose.

The rubber-latex-vinyl-resin-dispersion blends containing a relatively small quantity of vinyl resin dispersion or a vinyl resin dispersion in which only a small proportion of carboxylic acid is present, were found to require only very small quantities of stabilizers or protective colloids or even no stabilizers or protective colloids at all in order to be perfectly stable over extended periods. On the other hand, a controlled and uniform coagulation of the rubber-latex-vinyl-resin-dispersion emulsions according to the invention can be easily effected by any of the rubber latex coagulation methods well known in the art, to yield films which are tougher than ordinary rubber films and have characteristics somewhat similar to those of the "Buna N" polymers.

Products made from the rubber-latex-vinyl-resin emulsions according to the invention were found to be highly resistant against organic solvents and to have a comparatively high modulus as well as good tensile strength, hardness and abrasion resistance characteristics.

Particularly satisfactory results are obtained with blends containing between 24 and 40 parts by weight of a liquid vinyl resin dispersion according to the present invention to about 100 parts by weight of solid rubber in the form of a latex.

The following examples may serve to illustrate the invention without limiting the same.

Example 1

15 g. of monomeric methacrylic acid were mixed with 108 g. of monomeric acrylo nitrile and 0.072 g. of benzoyl peroxide, and the mixture was refluxed for one hour. 40 g. of the resulting smooth milky dispersion were stirred into 166 g. of a 60% centrifuged rubber latex.

The blend was heated in a closed container for 2 hours at 212° F. Then, the resulting material was completely coagulated, washed and dried. The film obtained in this manner which appeared tougher than ordinary rubber film and resembled somewhat the "Buna N" polymers, was tested against ordinary crepe rubber as follows:

Two samples, i. e. a sample A containing 100 parts by weight of rubber-acrylic polymer blend and a sample B containing 100 parts by weight of smoked sheet, were each milled with 5 parts by weight of zinc oxide, 1 part by weight of stearic acid, 2.5 parts by weight of sulphur, 50 parts of Gastex carbon black and 1 part by weight of mercapto benzothiazole. Both samples A and B were then cured for 30 minutes at a temperature of 287° F.

Comparative mechanical tests of the two products gave the following results:

|  | Sample A | Sample B |
|---|---|---|
| Tensile strength, lbs. per sq. in | 2,575 | 2,270 |
| Per cent elongation | 465 | 440 |
| Modulus 300% | 1,260 | 1,050 |
| Shore | 58 | 48 |

A solvent resistance test was made by immersing the products in naphtha for 3 days at room temperature. The results were as follows:

|  | Sample A | Sample B |
|---|---|---|
| Per cent increase in weight | 134 | 172 |
| Per cent increase in gauge | 43.4 | 50.4 |

Example 2

7 g. of monomeric methacrylic acid were mixed with 133 g. of acrylo nitrile and 0.082 g. of benzoyl peroxide. The mixture was refluxed for one and one-half hours. 40 g. of the resulting milky dispersion were added to 166 g. of 60% latex. The resulting blend was coagulated, washed and dried. The product was tested against a sample of ordinary rubber stock as follows:

A sample C containing 100 parts by weight of the rubber-acrylic polymer blend and a sample D consisting of 50 parts by weight of smoked sheet and 50 parts by weight of pale crepe were each milled with 7 parts by weight of zinc oxide, 3 parts by weight of sulphur, 3 parts by weight of stearic acid, 0.75 part by weight of mercapto thiazole and 35 parts by weight of Micronex carbon black. Both samples C and D were then cured for 40 minutes at a temperature of 287° F.

The results of comparative tests made with the two products were as follows:

|  | Sample C | Sample D |
|---|---|---|
| Tensile strength, lbs. per sq. in | 2,660 | 2,355 |
| Per cent elongation | 375 | 500 |
| Modulus 300% | 1,780 | 1,040 |
| Shore | 68 | 55 |
| Swell in Varnoline, increase in weight: |  |  |
| Per cent after 24 hours | 114 | 170 |
| Per cent after 8 days | 120 | 180 |

Example 3

As in Example 2, 7 g. of monomeric methacrylic acid were mixed with 133 g. of acrylo nitrile and 0.082 of benzoyl peroxide, but in this case the mixture was refluxed for only one hour.

A series of samples was prepared by mixing the resulting milky dispersion with 60% rubber latex in the following proportions:

|  | Acrylic polymer | 60% latex |
|---|---|---|
|  | G. | G. |
| Sample E | 40 | 166 |
| Sample F | 24 | 166 |
| Sample G | 16 | 166 |
| Sample H | 8 | 166 |
| Sample I | 0 | 166 |

Into 100 parts by weight of each of the samples were then worked, as in Example 2, 7 parts by weight of zinc oxide, 3 parts by weight of sulphur, 3 parts by weight of stearic acid, 0.75 part by weight of mercapto benzo thiazole and 35 parts of Micronex carbon black. All the samples were then cured for 40 minutes at 287° F.

Testing of the various samples gave the following results:

|  | Sample | | | | |
|---|---|---|---|---|---|
|  | E | F | G | H | I |
| Tensile strength, lbs. per sq. in. | 3,060 | 3,370 | 3,620 | 3,680 | 2,110 |
| Per cent elongation | 440 | 480 | 320 | 530 | 525 |
| Modulus 300% | 1,850 | 1,600 | 1,540 | 1,500 | 775 |
| Shore | 65 | 65 | 64 | 63 | 49 |
| 24 hour immersion in naphtha at room temperature: |  |  |  |  |  |
| Per cent increase in weight | 115.5 | 121 | 125 | 135 | 200.6 |
| Percent increase in gauge | 41.4 | 42 | 42.5 | 46.5 | 49.5 |

Example 4

7.2 g. monomeric acrylic acid were mixed with 134 g. monomeric methacrylo nitrile and 0.082 g. benzoyl peroxide. The mixture was refluxed for one-half hour. The resulting dispersion was smooth and milky and could be blended with latex.

Example 5

8.6 g. monomeric methacrylic acid were stirred into 121.5 g. ethacrylo nitrile. 0.053 g. barium peroxide were added and the mixture was refluxed for one hour and 15 minutes to produce a milky dispersion.

Example 6

10 g. monomeric alpha ethyl acrylic acid, 167 g. monomeric methacrylo nitrile and 0.1 g. sodium persulfate were stirred together and the mixture was then refluxed for approximately 2 hours. The resulting milky dispersion could be blended with latex up to a proportion of 30 parts of acrylic resin dispersion to 100 parts of solid rubber in the form of latex without causing any coagulation of the blend.

It will be understood that, although in the preceding examples I have described only the blending of my new vinyl resin dispersion with natural rubber latex, these vinyl resin dispersions are equally well adapted to be blended with artificial latices made by redispersing coagulated rubber in water and, if desired, with synthetic latices obtained by the emulsification of synthetic rubbers.

Furthermore, instead of being blended with a rubber latex, my new vinyl resin dispersions may be incorporated into a rubber composition by milling the dispersions with coagulated new rubber or with reclaim on any suitable mill.

I claim:

1. The herein described process of making a liquid vinyl resin dispersion which can be blended with rubber latex to form substantially stable emulsions capable of controlled and uniform coagulation, which process comprises forming a mixture consisting of about one mol of a liquid monomeric alpha-unsaturated aliphatic acid having the general formula

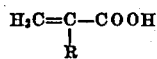

where R is selected from the group consisting of hydrogen and the lower alkyls, and from about 12 to about 30 mols of a liquid monomeric acrylonitrile compound having the general formula

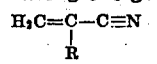

where R is selected from the group consisting of hydrogen and the lower alkyls, and subjecting said mixture to a controlled heat polymerization until a smooth, uniform, stable, milky dispersion is obtained.

2. A process as claimed in claim 1, in which the polymerization is effected in the presence of a polymerization catalyst.

3. A process as claimed in claim 1 in which the heat polymerization of the monomeric mixture is effected by refluxing the mixture for a period between one-half hour and two hours.

4. A process of making a liquid vinyl resin dispersion which can be blended with rubber latex to form substantially stable emulsions capable of controlled and uniform coagulation, which process comprises forming a mixture consisting of about 15 parts by weight of monomeric methacrylic acid and about 108 parts by weight of monomeric acrylo-nitrile and refluxing this mixture in the presence of about 0.072 part by weight of benzoyl peroxide for about one hour.

5. A process of making a liquid vinyl resin dispersion which can be blended with rubber latex to form substantially stable emulsions capable of controlled and uniform coagulation, which process comprises forming a mixture consisting of about 7 parts by weight of monomeric methacrylic acid and about 133 parts by weight of monomeric acrylo nitrile and refluxing this mixture in the presence of about 0.082 part by weight of benzoyl peroxide for about one hour to one and one-half hours.

6. A liquid vinyl resin dispersion which is free of emulsifying agents and which can be blended with rubber latex to form substantially stable emulsions capable of controlled and uniform coagulation, said dispersion being obtained by a heat polymerization of a mixture consisting of about one mol of a liquid monomeric alpha-unsaturated aliphatic acid having the general formula:

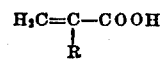

where R is selected from the group consisting of hydrogen and the lower alkyls, and from about 12 to about 30 mols of a liquid monomeric acrylonitrile compound having the general formula:

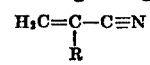

where R is selected from the group consisting of hydrogen and the lower alkyls, said heat polymerization being continued until a smooth, uniform, milky dispersion is obtained.

7. A process of making a stable rubber-latex-vinyl-resin emulsion capable of controlled and uniform coagulation, which process comprises forming a mixture consisting of about one mol of a liquid monomeric alpha-unsaturated aliphatic acid having the general formula:

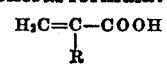

where R is selected from the group consisting of hydrogen and the lower alkyls and from about 12 to about 30 mols of a liquid monomeric acrylonitrile compound having the general formula:

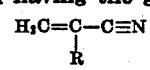

where R is selected from the group consisting of hydrogen and the lower alkyls, subjecting said mixture to a controlled heat polymerization until a smooth, uniform, milky dispersion is obtained, and blending between 8 parts and 40 parts by weight of said dispersion with a quantity of rubber latex containing about 100 parts by weight of solid rubber particles dispersed in water.

8. A process of making a substantially stable rubber-latex-vinyl-resin emulsion capable of controlled and uniform coagulation, which process comprises forming a mixture consisting of about 7 parts by weight of monomeric methacrylic acid and about 133 parts by weight of monomeric acrylo-nitrile, refluxing this mixture in the presence of about 0.082 part by weight of benzoyl peroxide for about one hour and blending between 24 parts and 40 parts by weight of the resulting smooth, uniform, milky dispersion with about 166 parts by weight of a 60% rubber latex.

9. A substantially stable rubber-latex-vinyl-resin emulsion capable of controlled and uniform coagulation and vulcanization, said emulsion comprising a quantity of rubber latex containing about 100 parts by weight of solid rubber particles and blended with said latex between about 8 parts and 40 parts by weight of a smooth, uniform, stable, milky vinyl resin dispersion obtained by a heat polymerization of a mixture consisting of about one mol of a liquid monomeric alpha-unsaturated aliphatic acid having the general formula $H_2C=C-COOH$
$\quad\quad|$
$\quad\quad R$ where R is selected from the group consisting of hydrogen and the lower alkyls and from about 12 to about 30 mols of a liquid monomeric acrylonitrile compound having the general formula $H_2C=C-C\equiv N$
$\quad\quad|$
$\quad\quad R$ where R is selected from the group consisting of hydrogen and the lower alkyls, said heat polymerization being continued until a smooth, uniform, milky dispersion has been formed.

10. A rubber-vinyl-resin coagulate of an emulsion comprising a quantity of rubber latex containing about 100 parts by weight of solid natural rubber particles and, blended with said latex, between about 8 parts and 40 parts by weight of a smooth, uniform, stable, milky vinyl resin dispersion obtained by a heat polymerization of a mixture consisting of about one mol of a liquid monomeric alpha-unsaturated aliphatic acid having the general formula $$H_2C=C-COOH$$
$$|$$
$$R$$

where R is selected from the group consisting of hydrogen and the lower alkyls and from about 12 to about 30 mols of a liquid monomeric acrylo nitrile compound having the general formula $$H_2C=C-C\equiv N$$
$$|$$
$$R$$

where R is selected from the group consisting of hydrogen and the lower alkyls, said heat polymerization being continued until a smooth, uniform, milky dispersion has been formed.

11. A vulcanized rubber-vinyl-resin coagulate of an emulsion comprising a quantity of rubber latex containing about 100 parts by weight of solid natural rubber particles and, blended with said latex, between about 8 parts and 40 parts by weight of a smooth, uniform, stable, milky vinyl resin dispersion obtained by a heat polymerization of a mixture consisting of about one mol of a liquid monomeric alpha-unsaturated aliphatic acid having the general formula $$H_2C=C-COOH$$
$$|$$
$$R$$

where R is selected from the group consisting of hydrogen and the lower alkyls and from about 12 to about 30 mols of a liquid monomeric acrylo nitrile compound having the general formula $$H_2C=C-C\equiv N$$
$$|$$
$$R$$

where R is selected from the group consisting of hydrogen and the lower alkyls, said heat polymerization being continued until a smooth, uniform, milky dispersion has been formed.

GERRY P. MACK.